(12) United States Patent
Chang et al.

(10) Patent No.: US 6,907,410 B2
(45) Date of Patent: Jun. 14, 2005

(54) TRANSPORTATION CREW DISPATCH METHOD BASED ON SINGLE DAY BUSINESS

(75) Inventors: Shaw-Ching Chang, Taipei (TW); Ming-Wen Tsai, Taipei (TW); Chih-Wei Huang, Taipei (TW); Yu-Chi Chung, Taipei (TW)

(73) Assignee: Institute for Information Industry, Taipei (TW)

( * ) Notice: Subject to any disclaimer, the term of this patent is extended or adjusted under 35 U.S.C. 154(b) by 443 days.

(21) Appl. No.: 09/986,030

(22) Filed: Nov. 7, 2001

(65) Prior Publication Data

US 2003/0105616 A1 Jun. 5, 2003

(51) Int. Cl.[7] .............................................. G06F 15/18
(52) U.S. Cl. ....................................................... 706/13
(58) Field of Search ........................................... 706/13

(56) References Cited

U.S. PATENT DOCUMENTS

| 5,434,796 A | * | 7/1995 | Weininger .................... 703/12 |
| 2003/0055614 A1 | * | 3/2003 | Pelikan et al. ................. 703/2 |

OTHER PUBLICATIONS

Van Kemenade et al, "Raising GA performance by Simultaneous Turning of Selective Pressure and Recombination Disruptiveness" IEEE International Conference on Evolutionary Computation, 1995.*

Chakraborty et al, "Ideal Marriage for Fine Tuning in GA" IEEE International Conference on Systems, Man and Cybernetics, 1999.*

* cited by examiner

Primary Examiner—George Davis
(74) Attorney, Agent, or Firm—Bacon & Thomas, PLLC

(57) ABSTRACT

A transportation crew dispatch method is disclosed. A plurality of initial samples is generated at first. Each initial sample includes a two dimensional transportation crew dispatch coding table. The initial samples are assigned as parent samples. A sample estimation is performed based on object functions and confinement formulas. By rule of roulette wheel, selection possibilities of chromosomes with superior fitness values are increased. After performing processes of chromosome crossover and mutation responsive to the selection possibilities of single point cutting and double point cutting, a process of sample update is executed by partial gene exchange so as to select preferred samples. The fitness value of each sample is determined from business cost, satisfaction of fairness index, and the disobedient cost of the confinement formulas.

13 Claims, 10 Drawing Sheets

|     | $d_1$ | $d_2$ | $d_3$ | ............ | $d_{\beta-1}$ | $d_\beta$ |
|-----|-------|-------|-------|--------------|---------------|-----------|
| $p_1$ | $W_{11}$ | $W_{12}$ | $W_{13}$ | ............ | $W_{1\beta-1}$ | $W_{1\beta}$ —21 |
| $p_2$ | $W_{21}$ | $W_{22}$ | $W_{23}$ | ............ | $W_{2\beta-1}$ | $W_{2\beta}$ |
| ⋮ | | | | ⋮ | | |
| $p_\alpha$ | $W_{\alpha1}$ | $W_{\alpha2}$ | $W_{\alpha3}$ | | $W_{\alpha\beta-1}$ | $W_{\alpha\beta}$ —21 |

TRANSPORTATION CREW DISPATCH METHOD BASED ON SINGLE DAY BUSINESS

BACKGROUND OF THE INVENTION

1. Description of Related Art

The present invention relates to a transportation crew dispatch method, and especially to a transportation crew dispatch method based on one day business.

2. Description of Related Art

The transportation crew can be classified as cockpit crew for driving a carrier driver and cabin crew for providing service to passengers. The duty dispatch is different due to the duties to be executed. As assigning duties, different factors are taken into consideration. The work of the cabin crew is to provide services to the passengers. Therefore, the confinement of the cabin crew is the carriers or members of a line, duty time, work days, rest time, working partners, number of members for waiting a duty, and others. The fairness of assigning duties to cabin crew is the main concerns, for example the fairness of number of times of working in special lines, number of times of holidays, number of times of waiting duties, number of times of non-local lodging, meal fee, duty hours, etc. The primary work of the cockpit crew is to protect the carrier in a safety condition, and thus, the responsibility of the driver is heavier than the cabin crew. More confinements are required for the cockpit crew. Other than above items, the duty hours, training times, certifications, and certifications for special lines of the drivers are important items to be considered. The fairness of the cockpit crew's duty is less important than that of the cabin crew, only items such as non-local lodging, times of entering into or leaving from a duty, and carrier driving time are taken into consideration.

In general, to reduce the complexity of a problem, the scheduling of a transportation office is cut into two major parts: one is the crew pairing problem, and the other is the crew rostering problem. The definition of the former item is the transportation duties that a member starts from a station to provide services in different flights according to the flight table and based on the confinement of minimum rest time, and finally the member returns to the station. However, a crew pairing problem based on a single day business is different slightly. Because one day is used as a based to assign duties to the members and the flying time is not long, it is definitely not to cut from a station to a station in assigning a duty. Generally, the convenience for executing the duty of next day and for positioning (PNC) are main concerns. Namely, when the members must work at different stations, the crew pairing can not determine which station is used as a base station. Some duties require the members to lodge overnight for executing the next day duty. To maintain the flexibility of assigning duties to crews, it is unsuitable to fix this duty to some duty combination. Therefore, station to station problem occurs in scheduling. However, this problem is induced after assigning a duty, not resulting from the duty.

In addition, in order to increase the efficiency of the carriers, the time interval in the schedule based on a single day business is not long enough for the crews to change the carrier duties. Therefore, the variation of the duty combination is less that that of a general duty combination. As a matter of fact, a duty combination based on a single day business can be produced in about 10 minutes. The difference is illustrated in the following table 1 and table 2.

TABLE 1

| General result of duties | Duty A: | Taipei -> Hong Kong -> Taipei -> Tokyo > Taipei |
|---|---|---|
| | Duty B: | Taipei -> Los Angeles -> Taipei -> Hong Kong -> Taipei |

| Date | 1 | 2 | 3 | 4 |
|---|---|---|---|---|
| Crew 1 | Taipei -> Los Angeles -> Taipei -> Hong Kong -> Taipei |||||
| | Taipei is the base station |||||

TABLE 2

Crew pairing based on one day business (Taipei, Kaohsiung are a base stations, Lodging at Tainan)

Original Flight Connection Table

| Carrier 1: | Taipei -> Taitung -> Taipei -> Kaohsiung -> Taipei -> Kingmen -> Taipei -> Taitung -> Taipei -> Kingmen -> Kaohsiung |
|---|---|
| Carrier 2: | Tainan -> Taipei -> Taitung -> Taipei -> Kaohsiung -> Taipei -> Kaohsiung |
| Carrier 3: | Kaohsiung -> Taipei -> Taitung -> Taipei -> Kaohsiung -> Taipei -> Tainan |

| Carrier 1 takes Taipei as a point to cut duties to generate duty A and B. Carriers 2 and 3 are kept in the same state to generate duty C and D | Duty A: | Taipei -> Taitung -> Taipei -> Kaohsiung -> Taipei -> Kingmen -> Taipei |
|---|---|---|
| | Duty B: | Taipei -> Taitung -> Taipei -> Kingmen -> Kaohsiung |
| | Duty C: | Tainan -> Taipei -> Taitung -> Taipei-> Kaohsiung -> Taipei -> Kaohsiung |
| | Duty D: | Kaohsiung -> Taipei -> Taitung -> Taipei -> Kaohsiung -> Taipei -> Tainan |

TABLE 2-continued

| date | 1 | 2 | 3 | Description |
|---|---|---|---|---|
| Crew 1 | Duty B | Duty D LOV | Duty C PNC 2 PNC 1 | The base of crew 1 is Taipei, LOV is a number for overnight at, for example, Tainan. PNC 2 means that after the crews leave from the duty, PNC returns to the base. |
| Crew 2 | Duty D LOV | Duty C | Duty A PNC 2 | The base of the crew 2 is Kaohsiung. PCN 1 means that before the crew enters into the duty, the crew moves from the base (PCN) to the place for entering into a duty. PNC 2 means that after the crews leave from the duty, PNC returns to the base |

It is known from above comparison that in the stage of forming duties, the crew duty generation problem based on daily business can not resolve the continuation of the working places of the crews in advance. These problems such as continuation of working places of the crews, entering into or leaving from a duty, non-local lodging, or minimum rest time can be resolved when the dispatching of the duty is performed.

In dispatching duties to crews, in general, the confinement of scheduling, skeleton activities, and certifications are taken into consideration so as to distribute the holiday of a crew and the combination of the duty. Therefore, the line of work of each crew is generated so as to determine the duty table and holiday schedule of a crew in the scheduled time interval. The minimum rest time (generally, one day) is formed in the duty. Therefore, in the dispatch of a duty to a crew, it is only necessary to consider the indicator of fairness, while the defects are: (1) the problem of dispatching crews between several stations can not be well processed; (2) If there are many flights, the schedule predetermined will be destroyed dramatically so as to induce a difficulty in the dispatch of crews; (3) The duties predetermined may reduce the cost of entering into or leaving from a duty. However, the flexibility of dispatching crews is lower than that based on a single day business. Thereby, more crews are necessary for a duty. The assignment of duty based on a single day business is to determine whether the minimum rest time is sufficient, whether the continuation of arriving place is correct, whether the duty time is over, whether the holiday is sufficient, and whether the crew is certified based on the daily duty time and the arriving time for the duty of next day. Therefore, the defects of the business schedule being programmed based on weeks will not occur. However, the operation time of the algorithm is larger. The following table shows the difference between the duty assignments based on daily business and week business.

TABLE 3

| Comparing items Scheduling Basis | Based on one day One day | Based on one week One week |
|---|---|---|
| Items to be considered | 1. Multiple stations 2. Number of run- | 1. One station 2. Time table of driving, |

TABLE 3-continued

| Comparing items Scheduling Basis | Based on one day One day | Based on one week One week |
|---|---|---|
| about duties of crews | ning 3. Updating to other carrier being difficult | minimum rest time, confinement of holiday, etc. 3. Update carrier for executing a duty |
| Items to be considered about assigning duties to crews | 1. The former duty station 2. Entering into or leaving from a duty, non-local lodging, and minimum rest time. 3. Combination of a predetermined activities. 4. The number of members for a duty. 5. Fairness | 1. Only fairness being considered 2. Fixed rest time |
| Defects | 1. Longer operation time | 1. Low efficiency for dispatching crews 2. Difficult in processing the problem that the members are placed in many stations. 3. Unsuitable to the schedules with a large variation. 4. The combination of predetermined activities and duties is not considered 5. Many crews required |

Accordingly, the conventional transportation crew dispatch method is not satisfactory and there is a need to have a novel method to o mitigate and/or obviate the aforementioned problems.

SUMMARY OF THE INVENTION

Accordingly, the primary object of the present invention is to provide a transportation crew dispatch method for resolving the problem encountered in the prior art.

To achieve above object, the present invention provides a transportation crew dispatch method based on a one day business. The method comprises the steps of: (A) generating a plurality of initial samples randomly, each including a two dimensional transportation crew dispatch coding table having a plurality of transportation duties, wherein the transportation crew dispatch coding table corresponds to one chromosome in a genetic algorithm, and each transportation duty in the transportation crew dispatch coding table corresponds to a gene in the genetic algorithm; (B) assigning the initial samples as parent samples, and performing a sample estimation based on object functions and confinement formulas to acquire sample fitness values of the chromosomes; (C) enhancing selection possibilities of chromosomes with relative superior fitness values by rule of roulette wheel; (D) performing processes of chromosome crossover and mutation responsive to the selection possibilities of single point cutting and double point cutting; (E) executing a process of sample update by partial gene exchange, wherein a fitness value of each sample is determined from business cost, satisfaction of fairness index, and the disobedient cost of the confinement formulas; and (F) when the number of execution from step (B) to (E) has reached a limited value, or the confinement formula has a disobeying number of zero and variation of the sample fitness value is within a preset value, stopping the method; otherwise, the acquired samples being utilized as a parent generation and then performing the steps of (B) to (F) again.

Other objects, advantages, and novel features of the invention will become more apparent from the following detailed description when taken in conjunction with the accompanying drawings.

BRIEF DESCRIPTION OF THE DRAWINGS

FIG. 2 is a two dimensional transportation crew dispatch table including a plurality of transportation duties.

FIG. 7 shows sets of the penalty value of the confinement formula about the dispatch and the weight parameter of each object for each cockpit crew.

FIG. 10 shows sets of the penalty value of the confinement formula about the dispatch and the weight parameter of each object for each cabin crew.

DETAILED DESCRIPTION OF THE PREFERRED EMBODIMENT

Figure 1:
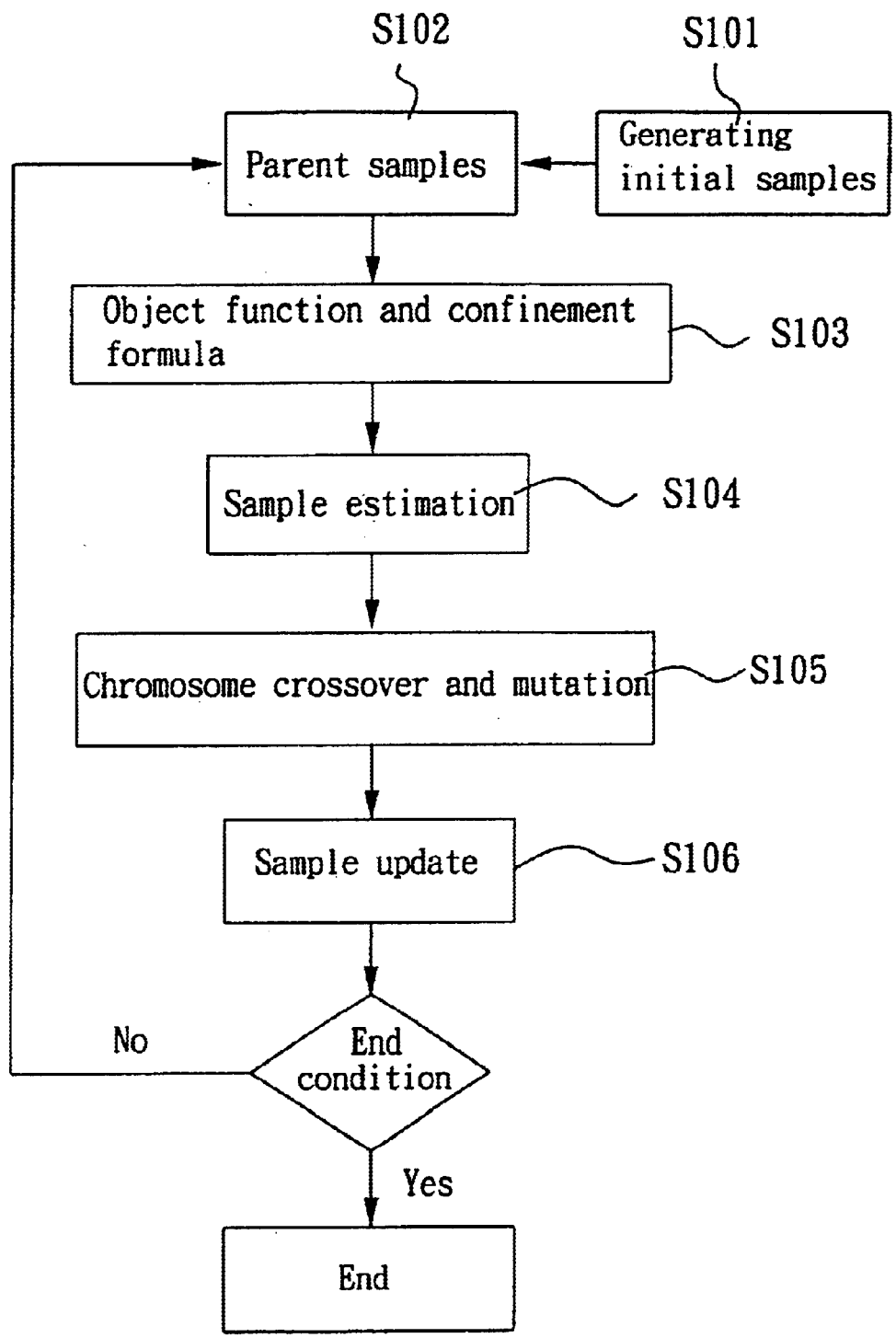
FIG. 1 is a flow diagram of the transportation crew dispatch method for a single day business in the present invention.

The present invention relates to a transportation crew dispatch method based on a single day's business. Referring to the flow diagram of FIG. 1, in that a genetic algorithm is used as a kernel to generate an optimal transportation crew dispatch table.

In above transportation crew dispatch method, at first, a plurality of initial samples is generated randomly (step S101). Each initial sample includes a two-dimensional transportation crew dispatch encoding table comprising a plurality of transportation duties 21. The longitudinal indexes $p_1, \ldots, p_\alpha$ represents the crew 1, crew 2, ..., crew $\alpha$, and the transversal indexes $d_1, \ldots, d_\beta$ represents time sequence 1, time sequence 2, ..., time sequence $\beta$. The coding value $\omega_{\alpha\beta}$ represents the number of the transportation duty. The transportation crew dispatch table is corresponding to one chromosome in the genetic algorithm. Each transportation duty in the transportation crew dispatch table is corresponding to a gene.

Figure 3:
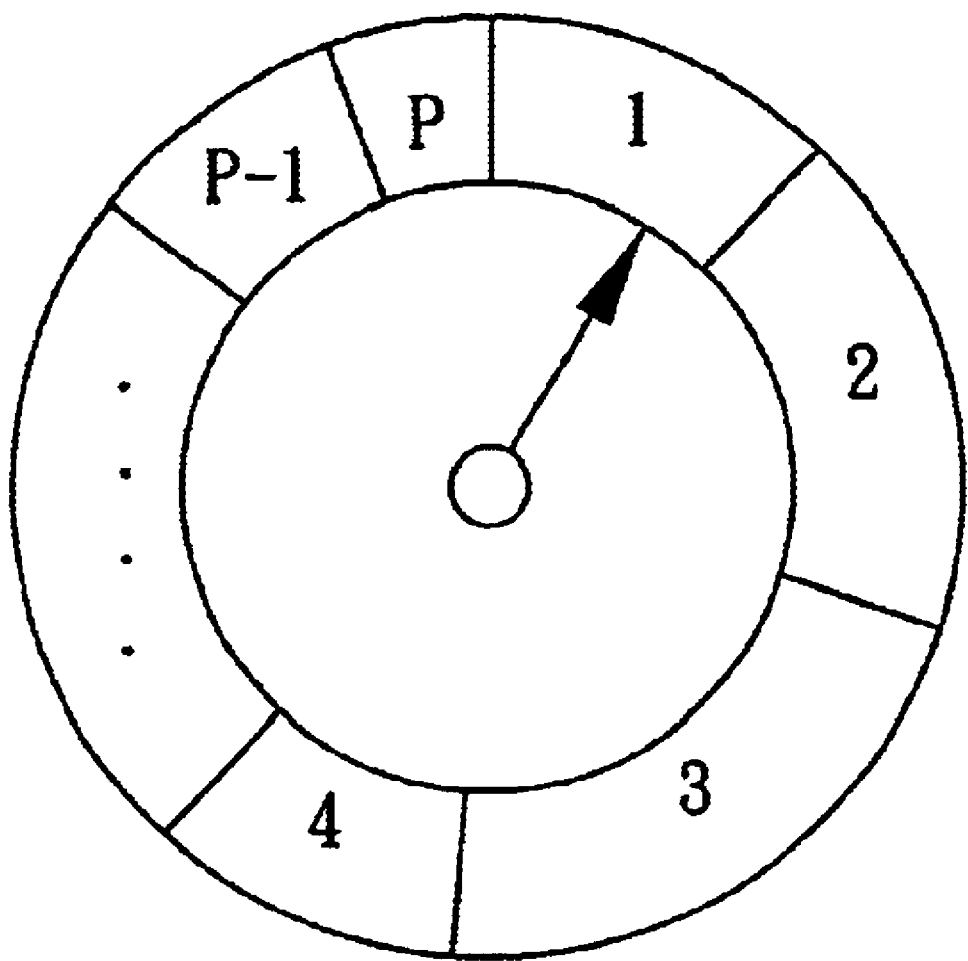
FIG. 3 is a schematic view showing the use of roulette wheel rule.

The sample of first generation generating randomly is utilized as a parent sample (step S102). To optimize the transportation crew dispatch table, an object function and confinement formula must be defined (step S103). It the obvious that the samples of first generation can not satisfy the definitions of all the object function and confinement formula. From sample fitness (step S104), it is known that the differences of the fitness value of chromosomes are large. Thus, rule of roulette wheel is used so that chromosomes with superior fitness values have a greater possibility to be selected and thus bad samples can be deleted. FIG. 3 is a schematic view showing the use of roulette wheel rule to delete samples. In the figure, 1 ... P are possibilities of selecting P samples. In the rule of roulette wheel, each gene has a selected possibility according to the fitness value. Therefore, the sample having a superior fitness value is assigned with a large possibility of being selected. Meanwhile, the part of the samples having inferior fitness values and possibly having superior genes locally are remained so as to remain the possibility for improvement.

Figure 4:
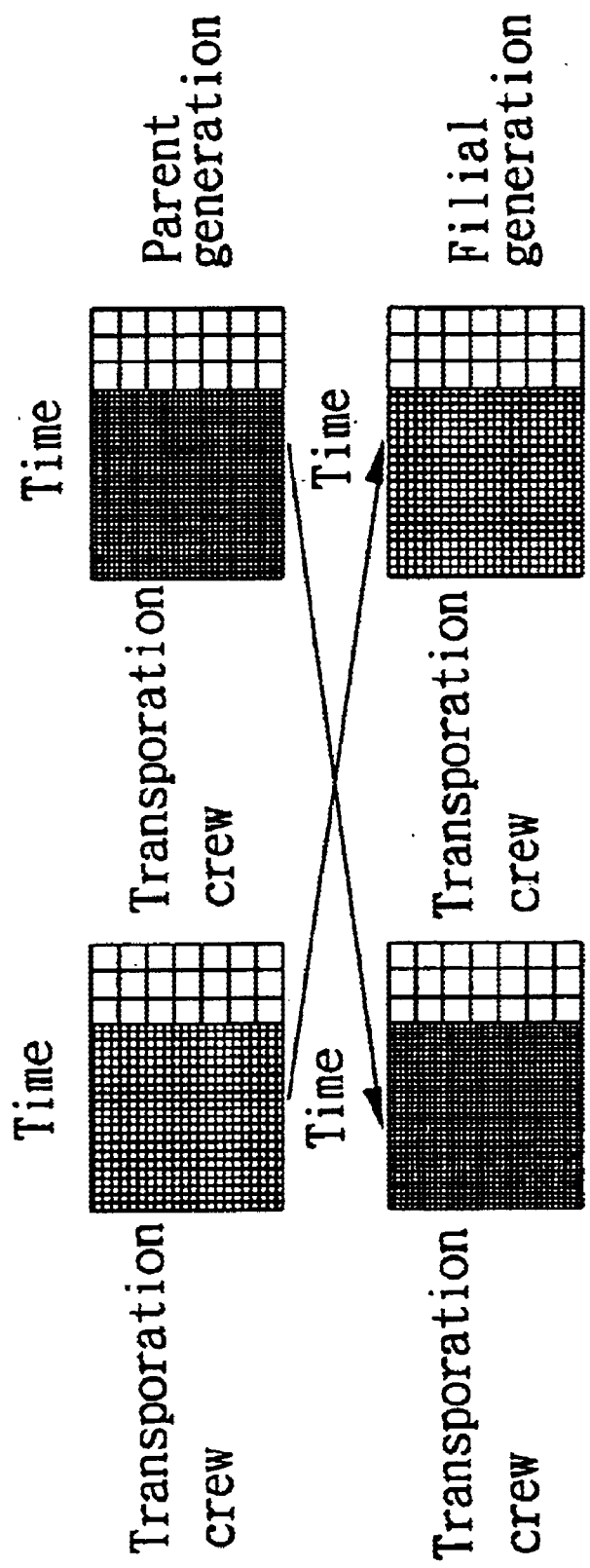
FIG. 4 is a schematic view showing the chromosome crossover.

The chromosome crossover process and gene mutation process are performed in step S105. The gene crossover generates the filial generation from a superior parent generation so that the evolution of each generation is better than the former generation. Since the daily transportation duty and content can not be changed after they are determined. To assure the correction of the daily transportation duties, in the chromosome crossover, the chromosome is cut longitudinally, as shown in FIG. 4. In chromosome crossover, if the selection possibility is larger than the predetermined possibility, the chromosome crossover is performed by a two point cutting process. If not, a single point cutting process is performed in the chromosome crossover process.

Figure 5:
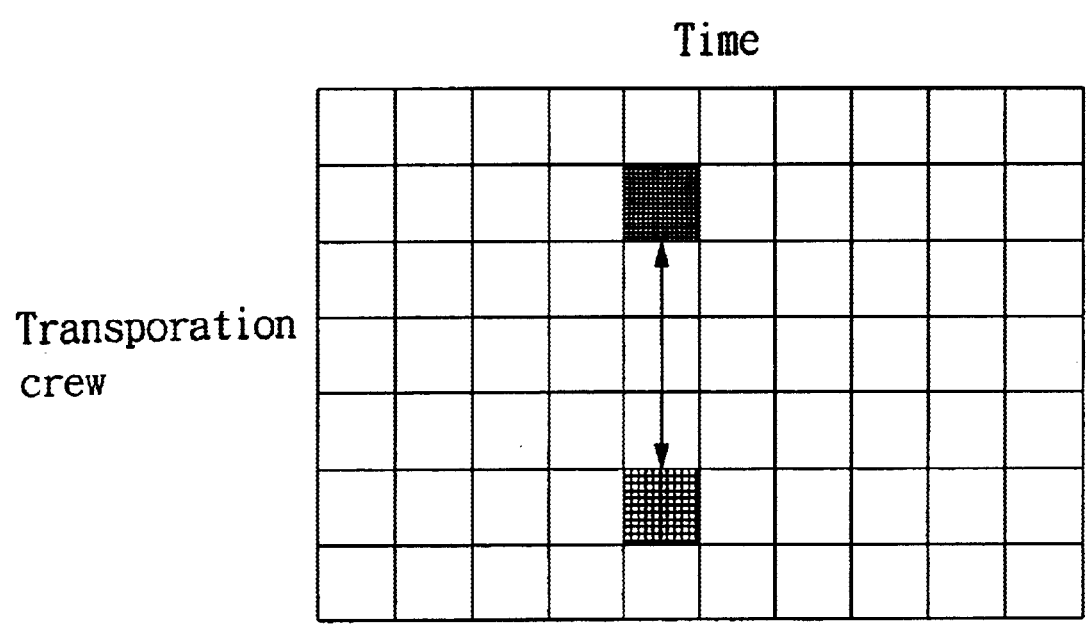
FIG. 5 is a schematic view showing the mutation of genes.

In mutation, a local gene exchange method is used so that the samples are diversified to expand the searching space of the samples and to avoid getting a local optimal solution. As the chromosome crossover method, the mutation must assure the correction of the daily transportation duties and the contents. Therefore, the mutation is confined in the exchange of daily transportation duties. If the selected possibility is larger than a preset possibility, the timing for mutation is selected at first. Next, a carrier for mutation is searched, and two crews at that time are interchanged. If not, no mutation is performed. The mutation process is illustrated in FIG. 5.

After the step of chromosome crossover, the step of sample update is performed (step S106). In this step, the samples are ordered based on the fitness values of the chromosomes and superior chromosomes are selected (for example, samples with lower fitness values). The score of each sample may be acquired from assembling object function values. For example, the object function is divided into two parts. One is the minimization of the working cost and the average level of a fairness indicator, and the other is the unsatisfied level of each confining equation.

Figure 6:
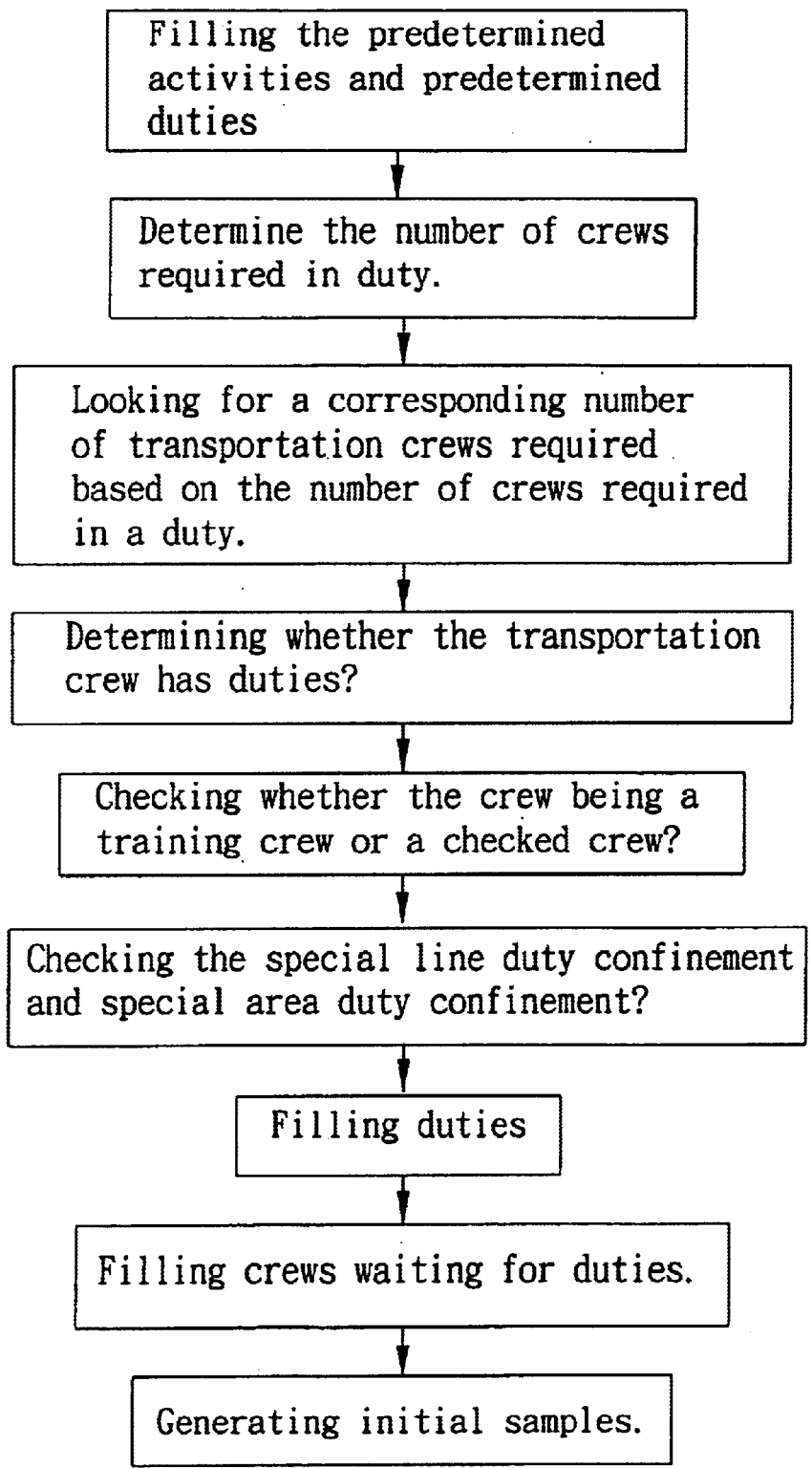
FIG. 6 shows an example of a flow diagram of generating cockpit crew initial samples.

For cockpit crews, the flow diagram for generating initial samples is illustrated in FIG. 6. The confinement formulas includes confinement of continuous working days, maximum duty time confinement, minimum rest time confinement, duty time confinement, standby member confinement, driving training confinement, special area driving confinement, special line driving confinement, confinement of the relation to the previous schedules, and confinement of preset transportation duty combination. The object of the solution is the followings.

The cost of the confinement formula is zero;

The business cost is minimized: the business cost includes the cost of entering into and leaving from a duty and non-local lodging cost, and;

The fairness indicators are averaged: the indicators includes duty hours, entering into and leaving from a duty, non-local lodging, and meal fee.

Figure 7:
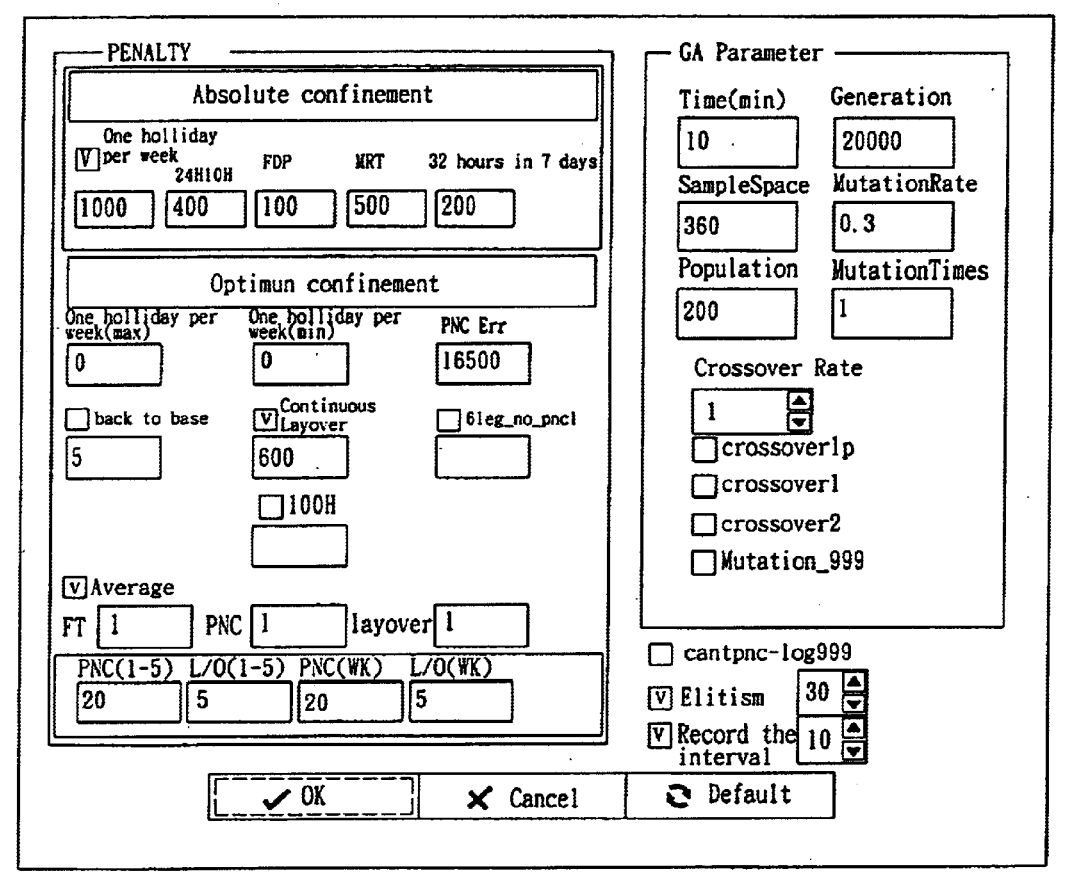

For example, the parameters in operation includes: 200 samples of parent generation, 160 samples of filial generation, ratio of crossover being 1 and mutation before 1000 generations being set as 1 for increasing the possibility for finding a correct direction and set as 3 after 1000 generation for increasing the converging ratio. After experiments, the set confinement formula penalty values and the sizes and classes of the weight parameters of each object are illustrated in FIG. 7.

Figure 8:
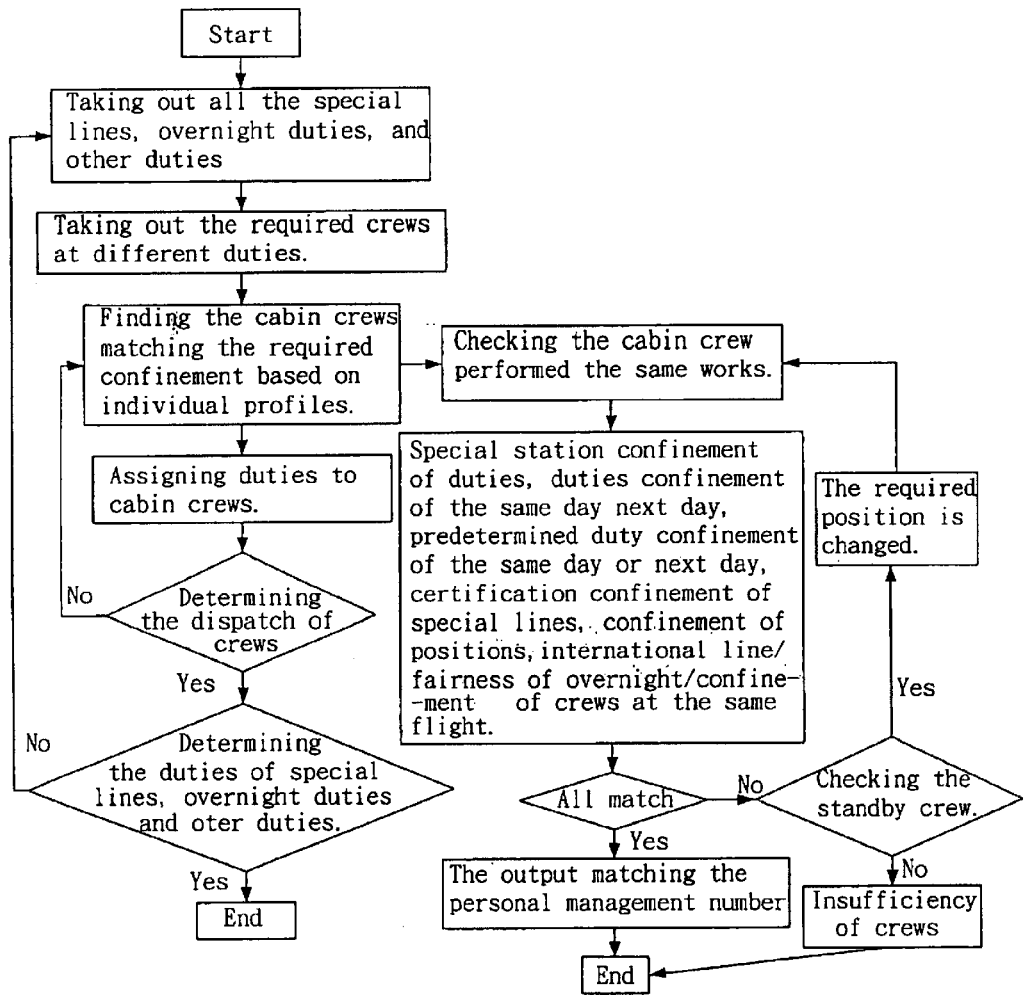
FIG. 8 shows an example of a flow diagram for generating cabin crew initial samples.

For the cabin crews, the schedule including all the duty combination of all the cabin crews and the predetermined activity is called as a sample herein. That is, the matrix elements of FIG. 2 are replaced by predetermined activities or preset duty combinations. The method for generating the sample is illustrated in FIG. 8. At first, the predetermined activities or preset duty combinations are filled into the matrix. Then the daily flight duty is selected randomly based on date assigned to a cabin crew which is randomly selected and has no duty. The process repeats until all the duties are assigned. To improve the fairness of some special duties (for example, special lines and the non-local lodging duties), some factors are considered when the initial sample is generated. The confinement formula in the figures includes the following items:

The special place confinement in the duty combinations: some duties are confined by the crews in some special stations, for example, the international line from the Chung Chen airport is performed by the crews in Taipei instead of members in Kaohsiung;

Confinement of performing a duty at that day or next day: whether a crew has been assigned with a duty;

Confinement of a duty: whether the duty has any impact with that day or next day;

Special line confinement: whether a crew has been confined to the line;

Confinement of the duty allowance: whether the duty is allowed to the crew;

Fairness of a special line or non-local lodging: assigning a duty based on the special line or non-local lodging confinement so that the dispatch of the duty is fair to the crews, wherein the fair dispatch of the special line is based on the following formula:

$$INTL_i = AVG(INTL\_Past_i) + AVG(INTL\_Curr_i) - INTL\_Cum_i \quad (1)$$

where $INTL_i$ is and number of times of assigning a special line to i-th crew; $AVG(INTL\_Past_i)$ is the average number of the special line assigned to the crew in past time, i.e., $$\frac{\sum_{i=1}^{\alpha} INTL\_Cum_i}{\alpha};$$

$INTL\_Cum_i$ being the accumulate number of times of the special line assigned to i-th crew in the past; and AVG ($INTL\_Curr_i$) is the average number of the special line being performed at this time, i.e., $$\frac{\sum_{j=1}^{p} INTL\_Duty_j}{\alpha},$$

$INTL\_DUTY_j=1$ representing that the duty j includes special lines and $INTL\_DUTY_j=0$ representing no special line.

The fair assignment of non-local lodging of a i-th crew is based on the following formula:

$$LOV_i = AVG(LOV\_Past_i) + AVG(LOV\_Curr_i) - LOV\_Cum_i \quad (2)$$

where $LOV_i$ is the number of times of non-local lodging of i-th crew, $AVG(LOV\_Past_i)$ is the average number of non-local lodging of a crew in the past, i.e., $$\frac{\sum_{i=1}^{\alpha} LOV\_Cum_i}{\alpha};$$

$LOV\_Cum_i$ represents the total number of times of non-local lodging of i-th crew in the past; $AVG(LOV\_Curr_i)$ is the average number of the duties of the non-local lodging at this time, i.e., $$\frac{\sum_{j=1}^{p} LOV\_Duty_j}{\alpha};$$

$LOV\_DUTY_j=1$ representing that the duty j has non-local lodging, and $LOV\_DUTY_j=0$ representing no non-local lodging at this duty.

If the object function (sample fitness value) of chromosomes is divided into four parts: a first one is a minimum level of the business cost, a second one is the average level of a fairness index, a third one is satisfaction level of personalization, and the fourth is the non-satisfaction level of each confinement formula. The components of the object function will be described in the following.

1. Cost of business:

(1) Positioning: as defined above.
   (2) Non-local lodging: it is different from the former in: (a) Duties must be performed by the same crew, (B) Since many crews are required, different stations are dispatched. Therefore, as the dispatch is based on stations, other then the second condition, all other conditions are avoided. Thus, to be beneficial in the chromosome crossover, this factor is dispatched at generating initial samples similar to that in a predetermined activities.

Figure 9:
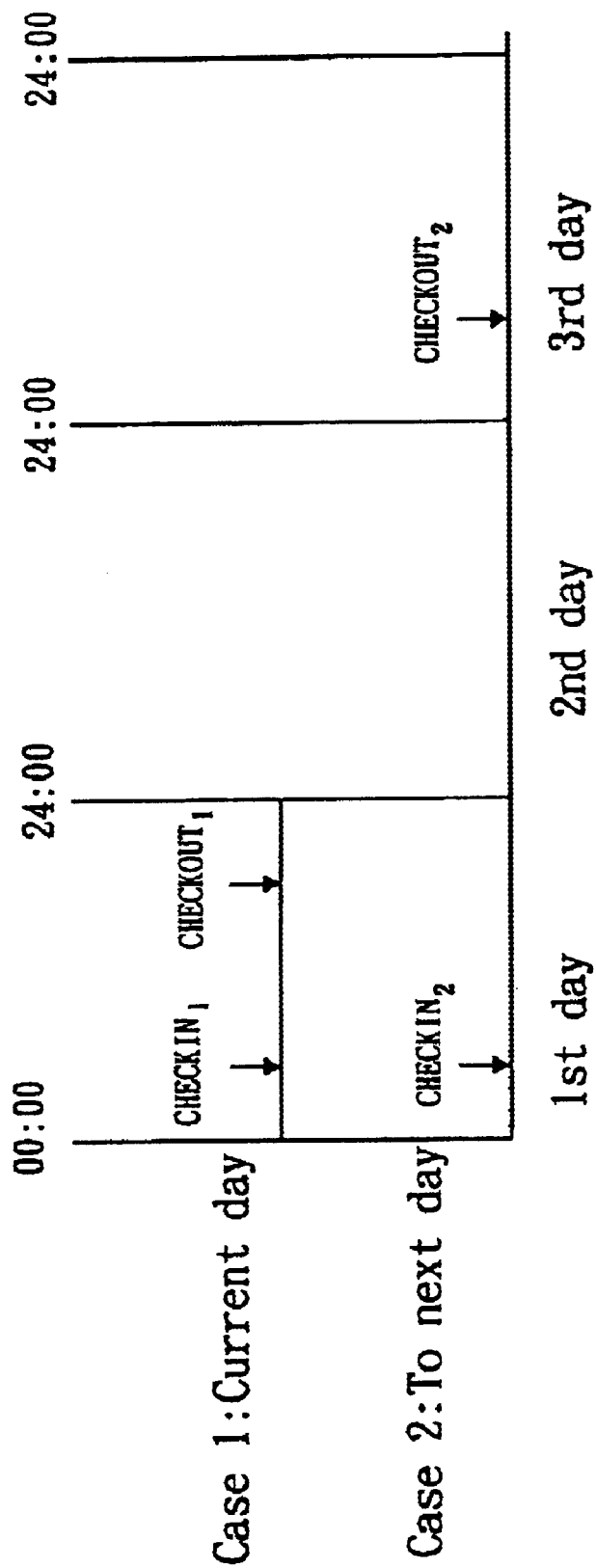
FIG. 9 is a schematic view showing the way for calculating cost of meal.

2. Fairness index:

(1) Meal fee: In practical, the meal cost is calculated at the time interval from entering into a duty to leave from the duty and arrive at the station. As illustrated in FIG. 9, in condition 1, the meal time $(PDM)=CHECKOUT_1-CHECKIN_1$. In condition 2, the meal cost $(PDM)= CHECKOUT_2+24*2-CHECKIN_2$. The fairness of the meal costs of the passenger service members is calculated by $$\text{Equal\_PDM} = \sum_{i=1}^{\alpha} |PDM_i - AVG(PDM_i)| * W_{PDM}, \quad (3)$$

where Equal__PDM is the fairness cost of a meal cost; PDMi is the meal time of i-th cabin crew; AVG(PDMi) is the average number of the PDM of a cabin crew, i.e., $$\frac{\sum_{i=1}^{\alpha} PDM_i}{\alpha};$$

WPDM is the weight for reducing the unfairness of the PDM.

(2) Number of holidays: Whether the holiday distribution of each cabin crew is fair, it can be represented as:

$$\text{Equal\_DO} = \sum_{i=1}^{\alpha} |DO_i - AVG(DO_i)| * W_{DO} \quad (4)$$

where Equal__DO is the fairness cost of the number of holidays; $DO_i$ is the mealtime of i-th cabin crew; $AVG(DO_i)$ is the average number of the DO of the cabin crew, i.e., $$\frac{\sum_{i=1}^{\alpha} DO_i}{\alpha};$$

and $W_{DO}$ is the weight for reducing the unfairness of the dispatch of holidays.

(3) The carrier types in a duty: Whether it is fair in the combination of carriers dispatching for a cabin crew. It can be represented by following equation:

$$\text{Equal\_AC} = \sum_{p=1}^{\beta} \sum_{i=1}^{\alpha} |AC_{ip} - AVG(AC_{ip})| * W_{AC_p} \quad (5)$$

where Equal__AC is the fairness cost of the type of carries; $AC_{ip}$ is the assigned number of the i-th passenger service member to p-th carrier; $AVG(AC_{ip})$ is the average number of assigning a p-th carrier to a cabin crew, i.e., $$\frac{\sum_{i=1}^{\alpha} AC_{ip}}{\alpha};$$

and $W_{AC_p}$ is the weight for reducing the unbalance of assigning a p-th carrier in a duty.

(4) Total number of times for waiting orders: Whether it is fair for each cabin crew in waiting orders. It can be represented by:

$$\text{Equal\_SB} = \sum_{i=1}^{\alpha} |SB_i - AVG(SB_i)| * W_{SB} \quad (7)$$

where Equal__SB is the cost of fairness for the total number of times for waiting orders; $SB_i$ is the total number of times for waiting order for i-th passenger service member; and $AVG(SB_i)$ is the average number of the total number of times for waiting orders for a cabin crew, i.e., $$\frac{\sum_{i=1}^{\alpha} SB_i}{\alpha};$$

$W_{SB}$ is the weight for reducing the unbalance of total number of times for waiting orders.

(5) Duty time: Whether the duty time for each member is fair after completing cabin crew duty scheduler. It can be represented by the following equation:

$$\text{Equal\_FT} = \sum_{i=1}^{\alpha} |FT_i - AVG(FT_i)| * W_{FT} \quad (7)$$

where Equal__FT is the cost for the unbalance of the duty time; $FT_i$ is the total duty time of i-th cabin crew; $AVG(FT_i)$ is the average duty time of the cabin crew, i.e., $$\frac{\sum_{i=1}^{\alpha} FT_i}{\alpha};$$

and $W_{FT}$ is the weight for reducing the unbalance of total number of times for duty time.

3. Factors of personalization (1) Personalized dispatch for standby duty: to avoid the insufficient rest time because of performing a duty in assigning a duty, the following table is used as a basis:

TABLE 4

| D1 | D2 | D3 |
|---|---|---|
| Duty 1 | Whole day standby | Duty 2 | where D1, D2, D3 are dates; Duty 1 is the duty that is ended early (before 18 o'clock); Duty 2 is a duty which is ended lately (after 18 o'clock). Therefore, the schedule is more stable. It can be represented as the following equation:

$$Hum\_SB = PHumSB * NHumSB \quad (3)$$

where HumSB is a fitness value of personalization assignment for waiting a duty; PhumSB is a penalty value for reducing the disobedience of the personalization assignment for waiting a duty; and NhumSB is the total number of times about the disobedience of the personalization assignment for waiting a duty.

(2) Personalized assignment for general duties: Under the condition of sufficient crews, for increasing the rest time of the crews, the following table 5 is used as a basis of dispatch:

TABLE 5

| | D1 | D2 |
|---|---|---|
| 1 | Duty A1 | Duty A2 |
| 2 | Duty B1 | Duty B2 |
| 3 | Duty B1 | Duty A2 | where Duty A1, and Duty A2 are duties that are ended early (before 18 o'clock), and Duty B1 and Duty B2 are the duty that are ended lately (after 18 o'clock). It is preferable that the third kind of duty is not used. It can be represent as $$HumDUTY = PHumDUTY * NHumDUTY \quad (9)$$

where HumDUTY is the estimation cost of personalized assignment for general duties; PHumDUTY is the penalty value for reducing the disobeying the personalized assignment for general duties; NHumDUTY is the total number of disobeying the personalized assignment for general duties.

4. Cost of confinement formula

According to the programming of the confinement formula, the disobedient cost of the confinement is the product of the number of times that the chromosomes disobeying the confinement and the corresponding penalty value. For a possible solution, the disobedient cost of the confinement is zero. It can be represented by a mathematical equation.

$$Penalty\_Cons=PCons7D24h*NCons7D24h+ PConsMRT*NConsMRT+PConsPNC999*NConsPNC999 \quad (10)$$

where PCons7D24h is the confinement formula penalty value for reducing a duty to be performed by a crew over seven days; NCons7D24h is the total number that a duty is performed by a crew over seven days continuously in some sample; PConsMRT is the penalty value of a confinement formula for reducing the disobey about the confinement of the minimum rest time; NConsMRT is the total number of times of disobey about the confinement of the minimum rest time; PConsPNC999 is the penalty value of a confinement formula for reducing the disobedience that the crews can not enter into or leave from a duty (the last position of the cabin crew in that day is different from the position of the duty next day); NConsPNC999 is the total number of times that the crews can not enter into or leave from a duty in some sample.

Therefore, the object function of the chromosomes showing four parts: business cost, satisfaction of the fairness index, estimation cost of personalization factor, and the penalty cost of disobeying a confinement formula. It can be represented by following equation:

$$SCORE = Cost\_PNC + \quad (11)$$
$$Equal\_PDM + Equal\_DO + Equal\_AC +$$
$$Equal\_SB + Equal\_FT +$$
$$HumSB + HumDUTY +$$
$$Penalty\_Cons$$

The sample fitness value of a possible solution only includes business cost, satisfaction of the fairness index, and estimation cost of personalization factor. It may be represented as the following equation:

$$SCORE = Cost\_PNC + \quad (12)$$
$$Equal\_PDM + Equal\_DO + Equal\_AC +$$
$$Equal\_SB + Equal\_FT +$$
$$HumSB + HumDUTY$$

Therefore, it is only necessary to determine whether the disobey number of the confinement formula is equal to zero. Then, it may know whether the solution is a possible solution. The ending condition of the whole algorithm is that the variation of the fitness value is within 3%.

Figure 10:
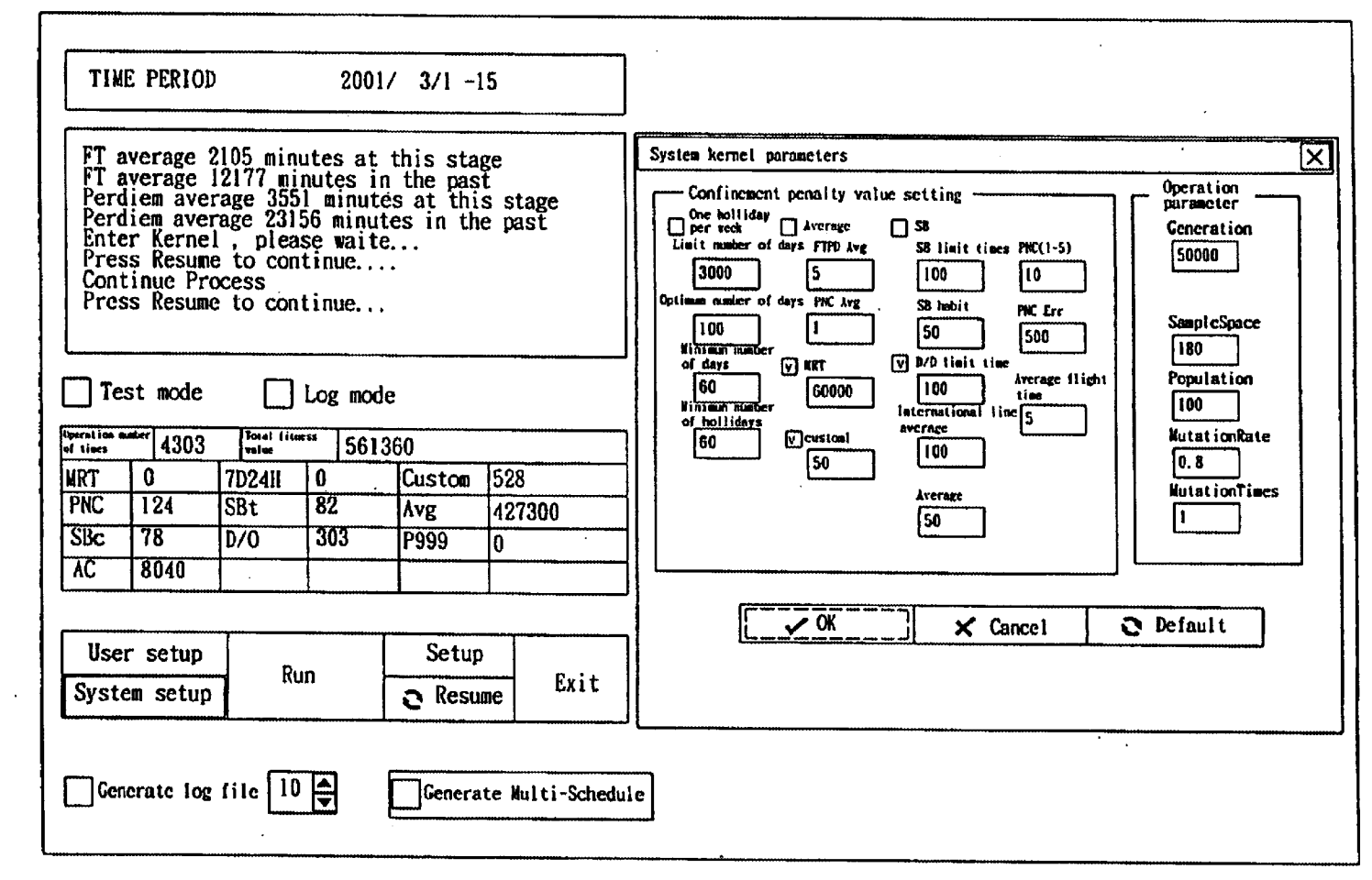

FIG. 10 shows a preset penalty value of the confinement formula after experiment and the size of the object weight parameters. The parameters used in the algorithm are 100 samples of parent generation, 80 sample of filial generation, the ratio of crossover being 1. The ratio of mutation is set as 1 for increasing the possibility for finding a correct direction.

In view of the foregoing, it is known that the algorithm of the present invention can express the features of a problem by setting object functions and confinement formulas and use a 2 dimensional matrix encoding way so as to have a higher efficiency for acquiring a solution. Therefore, an optimal transportation crew dispatch table is obtained.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A transportation crew dispatch method based on one-day business, comprising the steps of:

(A) generating a plurality of initial samples randomly, each including a two dimensional transportation crew dispatch coding table having a plurality of transportation duties, wherein the transportation crew dispatch coding table corresponds to one chromosome in a genetic algorithm, and each transportation duty in the transportation crew dispatch coding table corresponds to a gene in the genetic algorithm;

(B) assigning the initial samples as parent samples, and performing a sample estimation based on object functions and confinement formulas to acquire sample fitness values of the chromosomes;

(C) enhancing selection possibilities of chromosomes with relative superior fitness values by rule of roulette wheel;

(D) performing processes of chromosome crossover and mutation responsive to the selection possibilities of single point cutting and double point cutting;

(E) executing a process of sample update by partial gene exchange, wherein a fitness value of each sample is determined from business cost, satisfaction of fairness index, and a disobedient cost of the confinement formulas; and (F) when the number of execution from step (B) to (E) has reached a limited value, or the confinement formula has a disobeying number of zero and variation of the sample fitness value is within a preset value, stopping the method; otherwise, utilizing acquired samples as a parent generation and then performing the steps of (B) to (F) again.

2. The transportation crew dispatch method based on one-day business as claim in claim 1, wherein the transportation crew is a cockpit crew.

3. The transportation crew dispatch method based on one-day business as claim in claim 1, wherein the confinement formula includes a confinement of continuous working days, a maximum duty time confinement, a minimum rest time confinement, a duty time confinement, a standby member confinement, a driving training confinement, a special area driving confinement, a special line driving confinement, a confinement of the relation to the previous schedules, and a confinement of predetermined transportation duty combination.

4. The transportation crew dispatch method based on one-day business as claim in claim 3, wherein the object function includes cost of the confinement formula being zero, business cost being minimized, and the fairness index being uniformly distributed.

5. The transportation crew dispatch method based on one-day business as claim in claim 1, wherein the transportation crew is a cabin crew.

6. The transportation crew dispatch method based on one-day business as claim in claim 5, wherein the confinement formula includes a special station confinement in the duty combinations, a confinement of current day or next day for executing a duty, a confinement of a duty being executed at current day or next day, a special line confinement; and a confinement of the duty allowance, fairness of a special line or non-local lodging.

7. The transportation crew dispatch method based on a one day business as claim in claim 6, wherein the object function of chromosomes is divided into four parts: minimum level of the business cost, average level of a fairness index, satisfaction of personalization, and non-satisfaction level of each confinement formula.

8. The transportation crew dispatch method based on a one day business as claim in claim 7, wherein the object function includes business costs, fairness indexes, personalization factors, and costs of confinement formulas.

9. The transportation crew dispatch method based on a one day business as claim in claim 8, wherein the business costs includes costs of entering into or leaving from a duty and costs of non-local lodging.

10. The transportation crew dispatch method based on a one day business as claim in claim 8, wherein the fairness indexes include meal fees, number of times of holidays, combinations of the carrier type, total numbers for waiting duties; and total time for executing duties.

11. The transportation crew dispatch method based on a one day business as claim in claim 8, wherein the factors of personalization includes personalized dispatch for standby duty and personalized dispatch for general duties.

12. The transportation crew dispatch method based on a one day business as claim in claim 8, wherein the disobedient cost of the confinement formulas is a product of a number of times that the chromosomes disobeying the confinement and corresponding penalty value.

13. The transportation crew dispatch method based on a one day business as claim in claim 12, wherein the disobedient cost of the confinement formula is zero.

* * * * *